Aug. 6, 1957  A. FENER  2,802,086
SEALING DEVICE FOR HEAT SEALING MACHINES
OF THE THERMAL IMPULSE TYPE
Filed Oct. 4, 1955

INVENTOR
Alfred Fener
BY
ATTORNEY

United States Patent Office 2,802,086
Patented Aug. 6, 1957

2,802,086

SEALING DEVICE FOR HEAT SEALING MA-
CHINES OF THE THERMAL IMPULSE TYPE

Alfred Fener, Brooklyn, N. Y., assignor to
Nicholas Langer, New York, N. Y.

Application October 4, 1955, Serial No. 538,365

8 Claims. (Cl. 219—19)

This invention relates to the art of heat sealing thermoplastic films, and, more particularly, to a novel and improved sealing device or bar for heat sealing machines of the thermal impulse type.

As disclosed in Langer Patent 2,460,460, heat sealing machines of the thermal impulse type essentially comprise a pair of pressure members or bars and a reciprocating mechanism therefor whereby pressure may be applied upon two or more layers of thermoplastic film to be heat sealed interposed therebetween. Examples of the commercially most important thermoplastic films are Pliofilm (rubber hydrochloride), Vinylite (a copolymer of vinyl chloride and vinyl acetate), Polythene (polyethylene), and Saran (vinyledene chloride). A heater element in the form of a thin and narrow strip of a metal of high specific resistance, such as a suitable nickel-chromium alloy known in the trade as Nichrome, is mounted on the face of at least one of said bars, constituting the operating or sealing surface of the machine. Sealing pulses of electric current may be passed through the said heater element under the control of a switching mechanism, the operation of which is coordinated to that of the reciprocating mechanism of the bars.

During the operation of the machine, operation of the switching mechanism is initiated substantially when the pressure members arrive into their pressure-applying position. A short pulse of current is then passed through the heater element, which, as a result of its low heat capacity, is heated to heat sealing temperature in a small fraction of a second. The heat thus produced is immediately transferred by surface contact to the region of the thermoplastic layers compressed between the bars, causing heat sealing thereof. A short period thereafter, the heat produced by the pulse of current is dissipated and the seal is cooled and consolidated under pressure whereby a strong and sound seal is obtained.

Heat sealing machines of the thermal impulse type provide important advantages over the commonly used heat sealing machines in which the sealing member is continuously maintained at a constant sealing temperature. Due to the fact that the thermal impulse principle permits the sealed region to cool and to consolidate under pressure, the quality of the seal is greatly improved. Also, the thermal impulse principle makes it possible to readily seal films of materials, which cannot be sealed on an industrial scale with sealing members continuously maintained at constant sealing temperatures, such as particularly Polythene and Saran.

Heat sealing machines of the thermal impulse type provided excellent results and achieved remarkable commercial success within a short period after their introduction. Certain practical difficulties were experienced, however, when it was desired to produce discontinuous or interrupted seals, in other words, seals wherein sealed linear portions of two layers of thermoplastic film alternate with unsealed linear portions of the said layers. There are many cases where interrupted seals of the described character are desirable. For example, when sealing certain types of produce or bakery products in plastic bags, the provision of a hermetic seal is to be avoided as it is necessary to permit "breathing" of the packaged products. This is readily accomplished by means of a discontinuous or interrupted seal. A similar requirement exists in the production of so-called "drawstring bags" wherein a string is sealed-in with the folded-back mouth portions of the bag and the ends of the string are to extend through unsealed regions of such portions. To produce such interrupted seals, it was heretofore necessary to mount a plurality of heater elements in a linearly aligned spaced relation with respect to each other on the sealing bar, each of said elements being individually tensioned on said bar. A structure of this type was rather difficult to build and, further, considerable difficulties were experienced when it was necessary to replace one or more of inoperative or burnt-out heater elements with new ones.

I have now discovered that the outstanding problem may be solved in a remarkably simple manner.

It is an object of the present invention to improve heat sealing machines of the thermal impulse type.

It is another object of the present invention to provide an improved heat sealing machine of the thermal impulse type in which provision is made for the efficient production of discontinuous or interrupted seals.

It is also within contemplation of the invention to provide an improved sealing device for heat sealing machines of the thermal impulse type which makes it possible to produce an interrupted or discontinuous seal by means of a single, uninterrupted and continuous elongated heater element.

The invention also contemplates a novel heat sealing bar of the thermal impulse type suitable for the production of discontinuous or interrupted seals which is simple in structure, is characterized by a long useful life, and which may be readily manufactured and sold on a practical and commercial scale at a low cost.

Other and further objects and advantages of the present invention will become apparent from the following description, taken in conjunction with the accompanying drawing, in which.

Figure 1:
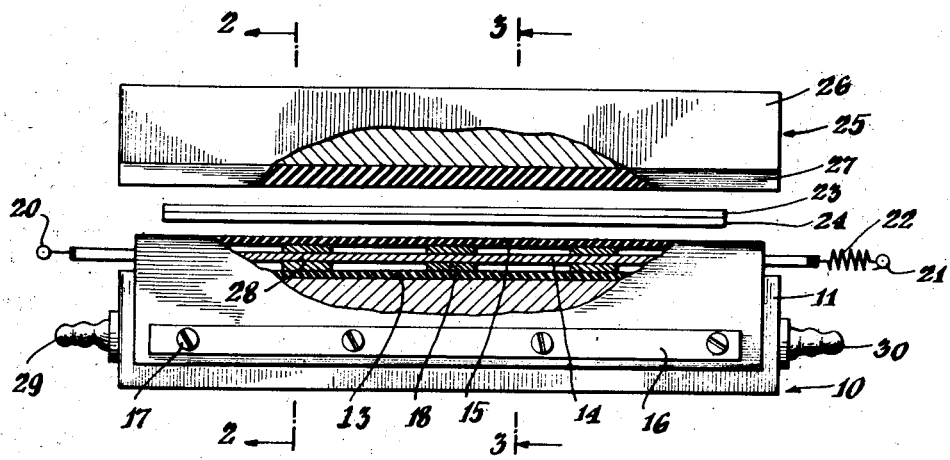
Fig. 1 is a side elevational view, somewhat fragmentary in character and having parts in section, of a preferred embodiment of the invention.

In the several views, the thicknesses of the various metallic and insulating layers have been greatly exaggerated for the sake of clarity of illustration.

Referring now more particularly to the drawing, reference numeral 10 generally denotes a sealing device embodying the invention which essentially comprises a metal base or bar 11 formed of metal of high heat conductivity, such as copper, brass, or aluminum. A channel or duct 12 may be provided in the bar, extending through its length, for passing a coolant fluid, for example, water, therethrough.

Upon the top and side surfaces of bar 11, there is provided a first layer 13 of heat-resistant insulating material, such as Teflon (polymerized tetrafluoro-ethylene), glass fiber cloth impregnated with Teflon, and the like. A thin and narrow heater strip 14 of metal or alloy of high specific resistivity is mounted or tensioned on the first insulating layer 13 and constitutes a heater element of low heat capacity for the bar. Examples of suitable high resistivity materials for the heater strip are Nichrome (a nickel base alloy containing 11–22% chromium and smaller amounts of silicon and manganese) and Inconel (a nickel base heat- and oxidation-resistant alloy with approximately 13% chromium, 6% iron, small amounts of manganese, silicon and copper). A second layer 15 of heat-resistant insulating material is placed on top of the heater strip 14. This second layer of insulation 15 may be formed of the same material as that of the first layer of insulation 13 upon which it is superposed and constitutes the operative or sealing face of the device. The lateral marginal portions of insulating layers 13 and 15 are secured to the sides of metal bar 11 by means of clamping strips 16 and screws 17.

Figure 2:
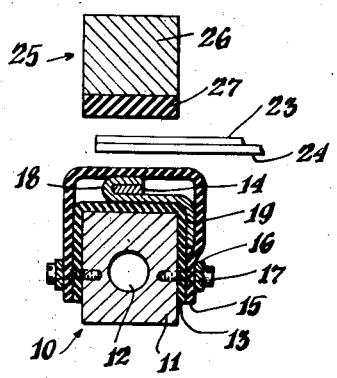
Fig. 2 is a section taken on line 2—2 of Fig. 1.

A sealing device having the structure so far described would produce a continuous and uninterrupted seal. In order to produce an interrupted seal, in accordance with the principles of the present invention, a layer of metal of low specific resistivity, or, in other words, of high electrical conductivity, is brought into surface contact with the regions of the heater element 14 where no heat seal is desired. This may be accomplished, for example, by soldering or brazing a short piece of copper foil to the top or bottom surface of the corresponding regions of the heater strip, or by bending a piece of copper foil around the said regions of the heater strip, in which case the soldering or brazing operation may be omitted. According to a preferred form of the invention which is shown in Fig. 2 of the drawing, one end of a strip 18 of copper foil is bent into a hairpin shape and is slipped over the portions of the heater strip 14 where no sealing heat is desired. The remainder of the said copper strip is first continued transversely and is then bent downward so that its end 19 extends between insulating layers 13 and 15. Obviously, the width of the copper strip determines the length of the portion of the heater strip where no sealing heat is generated. Since the conductivity of copper is over 50 times as high as that of Nichrome, it will effectively by-pass practically all of the current flowing through the portion of the Nichrome heater element with which it is in contact and will maintain such portion below sealing temperature.

Figure 3:
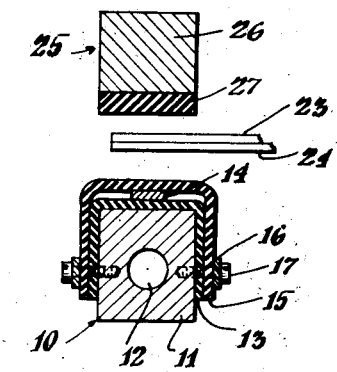
Fig. 3 is a section taken on line 3—3 of Fig. 1.

Upon assembling the sealing device of the invention, first, insulating layer 13 is bent around sealing bar 11 as indicated in Figs. 2 and 3 of the drawing and heater strip 14 is tensioned thereon by conventional means which may comprise securing one end of the strip to a fixed terminal 20 and securing the other end of the said strip to another fixed terminal 21 by interposition of a tension spring 22. Bent copper foil strips 18 are then slipped over the desired portions of heater strip 14 with their ends 19 extending downwardly. Finally, the second insulating layer 15 is placed over the bar 11 and is secured thereto under some tension by means of clamping strips 16 and screws 17. Thus, the second layer of insulation 15 will firmly press the hairpin or U-shaped portion of the copper foil strip 18 against the corresponding regions of the heater strip 14, maintaining the copper strip in good electrical contact with the heater strip. On the other hand, the bent-down end 19 of the copper foil strip will be firmly gripped between the first and second insulating layers, 13 and 15, thereby preventing accidental displacement of the copper foil strip longitudinally of the heater strip. Obviously, as many copper foil strips of such width may be placed on the heater strip as determined by the number and the length of interruptions desired in the seal.

It may be pointed out here that, as in Fig. 1, the thicknesses of the several layers have been greatly exaggerated for the sake of clarity of illustration; layers 13, 14 and 15 appear to be separated by an appreciable interspace. Actually, as the thickness of the several layers is only a few thousandths of an inch and as insulating layers 13 and 15 are to some extent compressible, the several layers will be arranged in a directly superposed relation and the top surface of insulating layer 15 will present a substantially smooth sealing face.

From the foregoing description, the operation of the sealing device of the invention will be readily understood by those skilled in the art. When it is desired to operate the device, a pair of superposed layers 23 and 24 of thermoplastic material are introduced between sealing bar 10 and a pressure bar 25 comprising a metal base 26 and a layer 27 of a heat-resistant elastomer, such as a suitable silicone rubber. Bars 10 and 25 are compressed by a suitable reciprocating mechanism (not shown), thereby applying sealing pressure to thermoplastic layers 23 and 24.

Terminals 20 and 21 of heater element 14 are then connected to a source of current for a short period of time, thereby causing a pulse of current to flow through the said element. However, as copper has a very much higher electrical conductivity than Nichrome, most of the heating current flowing through the heater element will be by-passed by the copper foil wherever such foil is provided in contact with the heater element so that no heating effect will be provided in regions 28 of the heater element. In other words, the heating effect of the pulse of current will be restricted to the remainder of the length of the heater element. Instead of copper, various other metals having relatively high conductivity as compared to Nichrome may be used with equal or similar results, such as silver, nickel, and the like.

After the sealing pulse has been discontinued, the heater element will quickly cool below the sealing temperature. Preferably, pressure is maintained upon the sealed layer for a short period thereafter to allow the seal formed to cool and to consolidate under pressure, thereby to develop the full strength of the seal prior to separating the bars. Rapid cooling of the sealing device may be further promoted by providing a circulatory flow of cooling water through channel 12 of bar 11 by means of inlet and outlet nipples 29 and 30.

Figure 4:
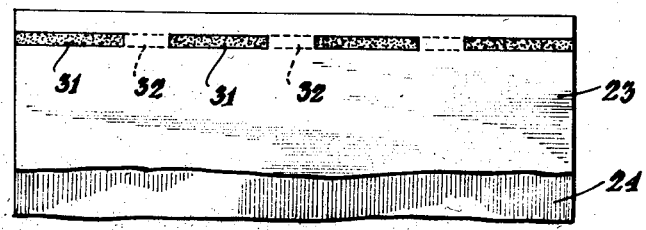
Fig. 4 is a top elevational view of a pair of thermoplastic layers bonded together in discontinuous linear regions by means of the sealing device of the invention.

As it will be readily observed in Fig. 4 of the drawing, the seal produced by the sealing device of the invention comprises a plurality of sealed regions 31, interrupted by or separated from each other by interposed unsealed regions 32 in accordance with the number, width and location of copper foil shorting strips 18 on heater element 14.

In a practical and commercial heat sealing machine embodying the invention, the thicknesses of the several layers of different materials may be varied within wide limits in accordance with the specific application. Thus, the lower layer of insulation may be formed of fiberglass fabric impregnated with Teflon having a thickness between 0.005″ and 0.015″ and the upper layer of insulation may be formed of the same material of lesser thickness, such as 0.003″ to 0.005″ to promote the transfer of sealing heat therethrough. The heater element may be formed of Nichrome ribbon having a thickness between 0.004″ and 0.008″, and the by-pass strips may be formed of copper foil having a thickness between 0.003″ and 0.010″, the preferred thickness being 0.005″.

Although the present invention has been disclosed in connection with a preferred embodiment thereof, variations and modifications may be resorted to by those skilled in the art without departing from the principles of the present invention. Thus, the advantages of the invention are not restricted to straight, linear heater elements of the illustrated type, but are applicable with equal or similar results to curved elements and sealing devices of the type disclosed and claimed in Fener Patent 2,714,416. All of these variations and modifications are considered to be within the true spirit and scope of the present invention, as disclosed in the foregoing description and defined by the appended claims.

I claim:

1. A sealing member for heat sealing machines adapted to produce interrupted seals comprising, in combination, a base, an elongated heater element formed of metal of high specific resistivity on said base adapted to be heated to sealing temperature by the passage of current therethrough, and pieces of metal of lower specific resistivity in contact with spaced selected portions of the length of said heater element intermediate to the ends thereof to by-pass the current flowing through said portions thereby to maintain the same below sealing temperature.

2. A sealing member for heat sealing machines adapted to produce interrupted seals comprising, in combination, a base, an elongated heater element formed of metal of relatively low electrical conductivity insulatedly mounted on said base and adapted to be heated to sealing temperature by the passage of sealing current therethrough, and metal of high electrical conductivity in surface contact with spaced selected portions of the length of said heater element intermediate to the ends thereof, said high conductivity metal being effective to by-pass most of the sealing current flowing through said portions thereby to maintain the same below sealing temperature.

3. A sealing device for heat sealing machines of the thermal impulse type adapted to produce interrupted seals comprising, in combination, a base, an elongated heater element formed of low conductivity metal insulatedly mounted on said base and adapted to be heated to sealing temperature by the passage of current therethrough, and a strip of high conductivity metal bent around at least one selected portion of the length of said heater element intermediate to the ends thereof and effective to by-pass the current flowing through said element.

4. A sealing device for heat sealing machines of the thermal impulse type adapted to produce interrupted seals comprising, in combination, a metal base, a layer of heat-resistant insulation thereon, a heater strip of low conductivity metal tensioned on said layer and adapted to be heated to sealing temperature by the passage of current pulses therethrough, and a foil of high conductivity metal bent around selected portions of the length of said heater strip intermediate to the ends thereof, said foil being effective to by-pass most of the current flowing through said strip thereby maintaining the portions of said strip in contact therewith below sealing temperature.

5. A sealing device for heat sealing machines of the thermal impulse type adapted to produce interrupted seals comprising, in combination, a metal base, a first layer of insulation on said base, a heater strip of low conductivity metal mounted on said layer and adapted to be heated to sealing temperature by the passage of current therethrough, foil of high conductivity metal in contact with selected surface portions of said heater strip intermediate to the ends thereof and effective to by-pass most of the current flowing through said strip, and a second layer of insulation superimposed upon said heater strip and constituting the operative and sealing face of the device.

6. A sealing device for heat sealing machines of the thermal impulse type comprising, in combination, a metal bar, a first layer of insulation bent around the top face of said bar, a heater strip of low conductivity metal tensioned in the longitudinal center of said layer and adapted to be heated to sealing temperature by the passage of current therethrough, a piece of high conductivity metal foil having one end bent around selected portions of said heater strip and effective to by-pass most of the current flowing through said strip, a second layer of insulation superimposed upon said first layer of insulation and covering said heater strip with the foil thereon and constituting the sealing face of the device, and means for securing the lateral marginal portions of said first and second layers of insulation to said bar.

7. A sealing device for heat sealing machines of the thermal impulse type comprising, in combination, a metal bar, a first layer of insulation bent around the top face of said bar, a heater strip of low conductivity metal tensioned in the longitudinal center of said layer and adapted to be heated to sealing temperature by the passage of current therethrough, a piece of high conductivity metal foil having one end bent around selected portions of said heater strip to by-pass the current flowing through said strip and having its other end extended downwardly along the side of said bar, a second layer of insulation superimposed upon said first layer of insulation and covering said heater strip with the foil thereon and constituting the operative face of the bar, and means for securing the lateral marginal portions of said first and second layers of insulation to said bar, the downwardly extending end of said piece of metal foil being clamped between said first and second layers of insulation to prevent accidental displacement of said foil longitudinally of said heater strip.

8. A sealing device for heat sealing machines of the thermal impulse type adapted to produce interrupted seals comprising, in combination, a metal base, a layer of insulation thereon, a heater strip of Nichrome tensioned on said layer and adapted to be heated to sealing temperature by the passage of current therethrough, and pieces of copper foil in contact with selected portions of said heater strip intermediate to the ends thereof, said foil being effective to by-pass the current flowing through said heater strip thereby maintaining the portions of the strip in contact therewith below sealing temperature.

References Cited in the file of this patent
UNITED STATES PATENTS

| | | |
|---|---|---|
| 1,435,392 | Heiser | Nov. 14, 1922 |
| 2,460,460 | Langer | Feb. 1, 1949 |
| 2,589,777 | Collins | Mar. 18, 1952 |
| 2,721,925 | Langer | Oct. 25, 1955 |